United States Patent [19]

Takahashi

[11] Patent Number: 4,841,478

[45] Date of Patent: Jun. 20, 1989

[54] DOCUMENT PROCESSOR

[75] Inventor: Tsutomu Takahashi, Kawasaki, Japan

[73] Assignee: Canon Kabushiki Kaisha, Tokyo, Japan

[21] Appl. No.: 923,089

[22] Filed: Oct. 24, 1986

[30] Foreign Application Priority Data

Oct. 31, 1985 [JP] Japan ................................ 60-244978

[51] Int. Cl.[4] ................................................ G06F 3/00

[52] U.S. Cl. ................................................ 364/900

[58] Field of Search ... 364/200 MS File, 900 MS File; 400/3, 7, 12, 64

[56] References Cited

U.S. PATENT DOCUMENTS

| | | | |
|---|---|---|---|
| 3,654,611 | 4/1972 | Bluethman et al. | 364/200 |
| 3,980,994 | 9/1976 | Ying et al. | 364/200 |
| 4,323,315 | 4/1982 | Demonte et al. | 400/63 |
| 4,360,806 | 11/1982 | Von Knorre et al. | 340/792 |
| 4,491,933 | 1/1985 | Ursin et al. | 364/900 |
| 4,509,138 | 4/1985 | Hayashi et al. | 364/900 |
| 4,556,332 | 12/1985 | Maekawa | 400/64 |

FOREIGN PATENT DOCUMENTS

| | | |
|---|---|---|
| 0112060 | 6/1984 | European Pat. Off. . |
| 2156118 | 10/1985 | United Kingdom . |

*Primary Examiner*—David Y. Eng

*Attorney, Agent, or Firm*—Fitzpatrick, Cella, Harper & Scinto

[57] ABSTRACT

A document processor comprising a memory for storing a document input by a keyboard and a display for displaying the document in the memory and a sign indicative of the position of a character. The document in the memory is caused to correspond to the character and sign indicative of the characters displayed on the display on the basis of information on the print position of a character and information on the pitch of characters.

15 Claims, 4 Drawing Sheets

DOCUMENT PROCESSOR

BACKGROUND OF THE INVENTION

1 Field of the Invention

The present invention relates to a document processor which is capable of displaying the actual print position of a character of a document to be displayed.

2 Related Background Art

Document processors with displays, for example, word processors such as electronic typewriters, are known. For example, in an electronic typewriter, a document is finished on the display and then the characters of the document are printed, so that beautiful printed results without any typing mistakes are obtained.

In many of such electronic typewriters, the displays can only display fewer characters than those in one line, so that the position of a character displayed on the display has no one-to-one correspondence to that of the character printed on a sheet of paper. Thus it is difficult to know where a character on the display will be printed on the sheet of paper. On the other hand, an electronic typewriter with a display which can display the number of characters equal to that of characters to be printed would be expensive, and the display would be large. Even if there are electronic typewriters which have a display which can display the number of characters equal to that of characters to be printed, no electronic typewriters in which the actual print position of a character or the number of characters can be recognized rapidly are found.

SUMMARY OF THE INVENTION

The present invention has been made in view of the above. It is an object of the present invention to provide a document processor which is capable of displaying the actual print position of characters in a document to be displayed.

It is an additional object of the present invention to provide a document processor in which even if the display displays characters fewer than those to be printed, the print position of characters of a displayed document can be recognized.

It is an additional object of the present invention to provide a document processor which includes input means for inputting a document to the processor, memory means for storing the document input by the input means, display means for displaying the document in the memory means and a sign indicative of the position of a character, and means for causing the document in the memory means to correspond to the characters and sign indicative of the character displayed on the display means on the basis of information on the print position of a character to print means and information on the pitch of characters to be printed.

It is an object of the present invention to provide a document processor which includes means for setting a print mode, first display means for displaying the print position of a character in accordance with the mode, means for inputting a document, and second display means for displaying information on the input document and information indicating the position of the document, wherein characters can be input while the position of characters already printed and the actual print position of an unprinted character are being confirmed.

DETAILED DESCRIPTION OF THE PREFERRED EMBODIMENT

Now one embodiment of the present invention will be described with respect to the drawings. The display referred to in the present invention may only be required to display document information input to the typewriter proper and may be separated from the typewriter proper.

Figure 1:
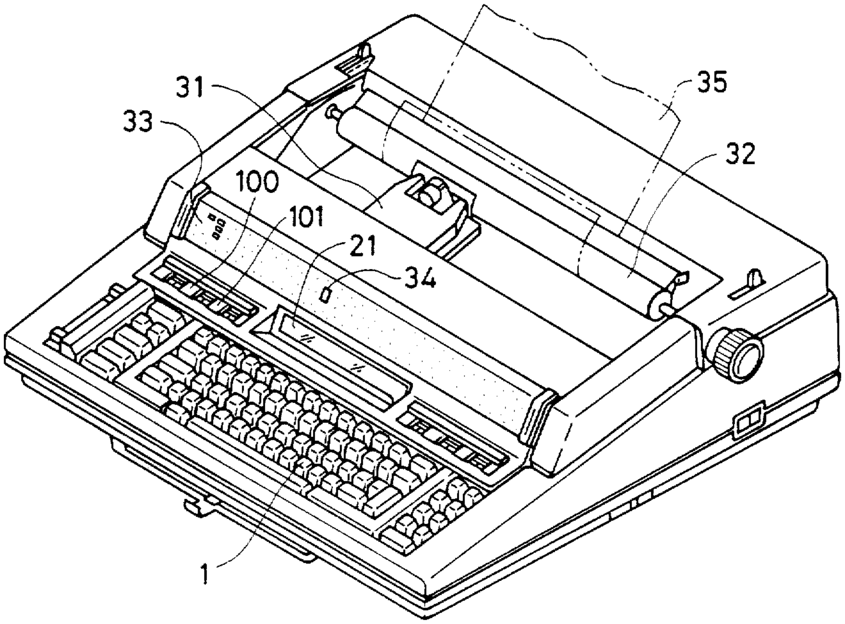
FIG. 1 is a schematic of an electronic typewriter according to the present invention.

FIG. 1 shows the external appearance of the structure and arrangement of an electronic typewriter according to the present invention. Here, reference numeral 1 denotes a keyboard for inputting a document; 21 a display for display of the document input by the keyboard; 31 a print head (carrier) including a type wheel, a hammer, a ribbon, etc., moving right and left along a platen 32 to print characters in a mode set by a mode setting key 100, and printing a document input by the keyboard on a sheet of paper 35 or the like. Reference numeral 101 denotes a key for setting a print pitch.

Reference numeral 34 denotes pitch scale disposed above display 21. Reference numeral 33 denotes a pitch indicator which indicates the position of the print head 31 (the number of characters) on pitch scale 34 and from the left end to which the carrier can move on the basis of a scale in accordance with the pitch of characters of pitch scale 34 in interlock with the movement of the carrier based on the pitch information set by pitch setting key 101. The mode setting key 100 sets a print mode such as a C/C mode in which print is performed each time one character is input, an L/L mode in which print is performed each time one line is input, or a W/W mode in which print is performed each time one word is input, which will also be described later.

Figure 2:
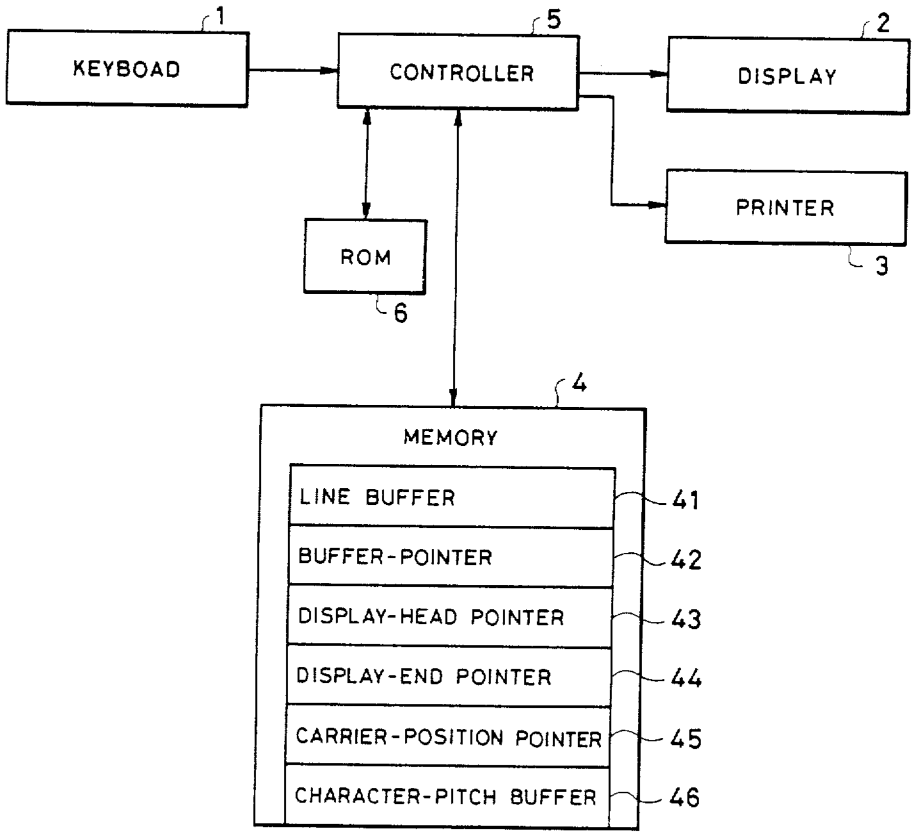
FIG. 2 is a block diagram of an embodiment of the typewriter.

FIG. 2 is a block diagram showing a particular embodiment in which a key code input by keyboard 1 is determined by controller 5 including a microprocessor. If the key code is a character code, it is stored in a line buffer 41 in a memory 4. A buffer pointer 42 includes an address pointer which indicates the position of data stored in line buffer 41 and which is incremented each time a character code is stored in line buffer 41. Reference numerals 43 and 44 denote a display-head pointer and a display-end pointer displaying the head and end addresses, respectively, of a character code in line buffer 41 to be displayed by display 2. The pointers are updated each time the character code is stored in line buffer 41 under conditions such as, for example, will be described later. Both the pointers 43 and 44 are also updated so that the number of character codes present between pointers 43 and 44 does not exceed the number of characters displayed by display 2. Reference numeral 45 denotes a carrier-position pointer which holds the position of carrier 31 indicated by pitch indicator 33.

Reference numeral 46 denotes a character pitch buffer which stores the character pitch set by a keyboard input. It should be noted that display 2 and printer 3 may each include a controller aside from the controller 5 for the typewriter proper.

Figure 4:
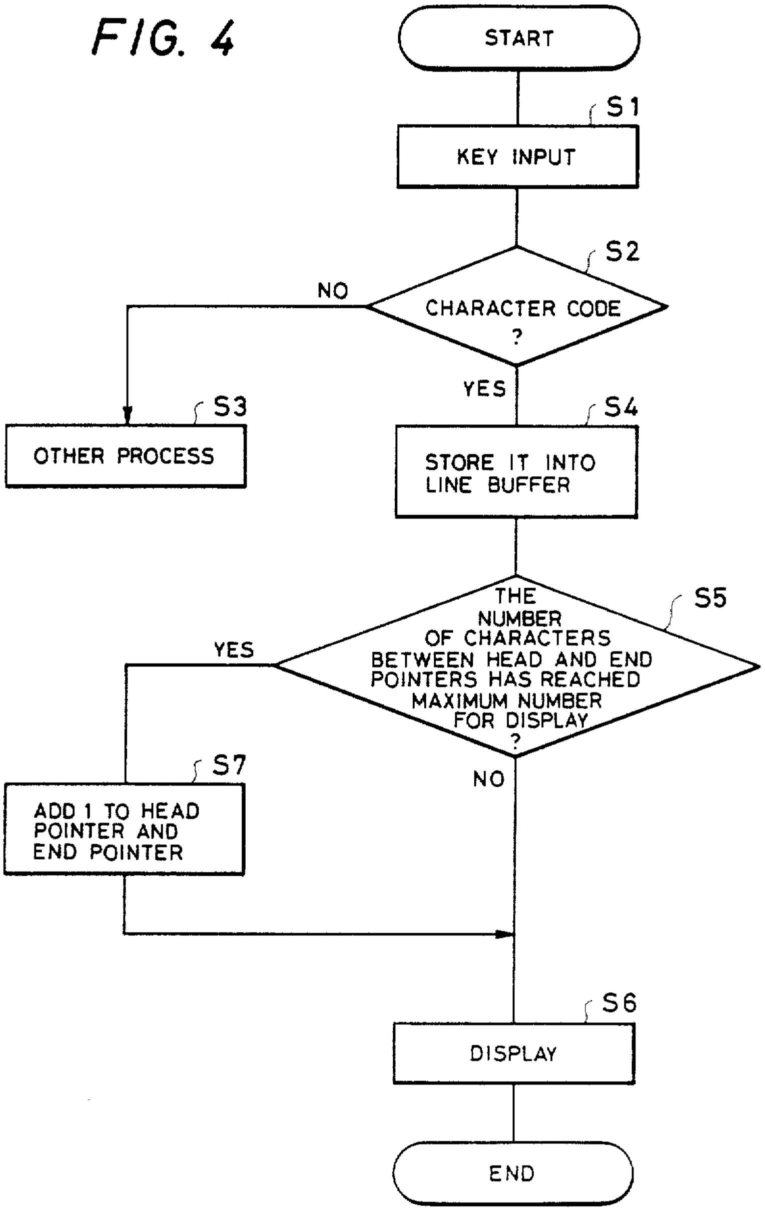
FIG. 4 is a flowchart showing one example of the display operation.

Reference numeral 6 denotes a ROM (Read Only Memory) which stores a control process such as that shown in FIG. 4. Display 2 has a 24×120 (line x column)-bit RAM and display 21 formed as a 24×120 (line x column)-dot liquid crystal display. One bit in the RAM corresponds to one dot in display 21. When controller 5 writes into the RAM data corresponding to the dot pattern of a character row to be displayed, the character row can be displayed.

Figure 3A:
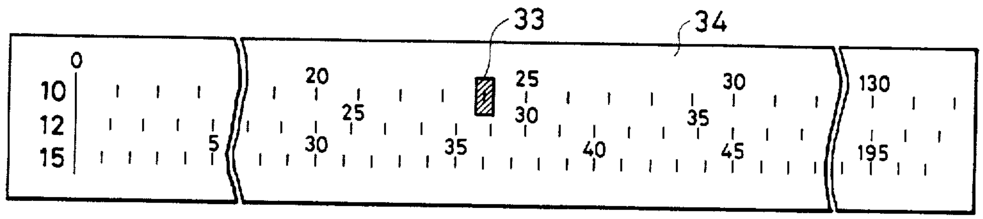
FIG. 3A, illustrates a pitch scale and a pitch indicator.

The RAM and display portion 21 of display 2 are each divided into two, one having charge of characters and the other having charge of a sign indicative of the print position, in accordance with the difference between their display contents. For example, FIG. 3A shows the pitch scale 34 of printer 3 including three marked character scales corresponding to 10, 12 and 15 pitches. In FIG. 3A, pitch indicator 33 shows that the carrier is positioned at the 24th character from the left end for the 10-pitch.

Figure 3B:
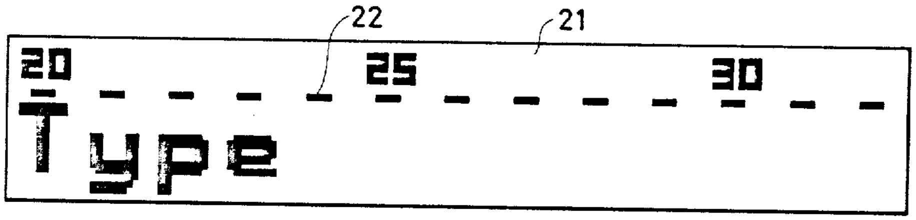
FIG. 3B illustrates the display stage of a display obtained when the characters "Type" are input.

FIG. 3B shows on display 21 that the carrier is at the position shown in FIG. 3A. It also shows the stage indicated "Type" starting with the 20th character from the left end for the 10-pitch. Display 21 is divided into two areas, i.e., the upper portion indicates a numeral corresponding to every 5th scale of pitch scale 34 and a row of signs (−) each indicative of the position of each character, and the lower portion indicates the input character row "Type". At this time, a sign 22 indicative of the display position of the next character, for example, the position of the carrier shown in FIG. 3A, may be displayed flashed or enlarged. It goes without saying that the position of the carrier and the display position of the next character on the display portion may vary depending on a print mode, for example, the L/L mode in which print is performed each time one line is input, the C/C mode in which print is performed each time one character is input, or the like.

When a print command is given from keyboard 1 to controller 5, this controller sequentially transfers the character data stored in line buffer 41 to printer 3 thereby to print the character data.

The display operation of the above structure will be described with respect to FIG. 4.

First, at step S1, data is keyed in. At step S2, it is determined whether or not the data is a character code. If not, control passes to step S3 where other processing is performed. If the data is a character code, control passes to step S4 where the input character code is stored in line buffer 41 and then control passes to step S5.

At step S5, it is determined whether or not the number of characters between the display-head and end pointers has reached the maximum number of characters displayed in display 21. If not, control passes to step S6 where the keyed-in character codes are delivered to display 2 and displayed. One example of aspects of display is, for example, as shown in FIG. 3B. It should be noted that the characters stored in line buffer 41 are caused to correspond to the scale and numeral indications in the upper portion of display 21 in accordance with the value of carrier-position pointer 45 indicative of the carrier position and the value of character pitch buffer 46 (in this case, corresponding to a 10-pitch).

If at step S5 the number of characters between display-head and end pointers reaches the maximum number of characters displayable by display 21 (at this time, the of characters maximum number displayed by display 21), control passes to step S7 where one is added to each of the head and end pointers. The control passes to step S6.

Figure 3C:
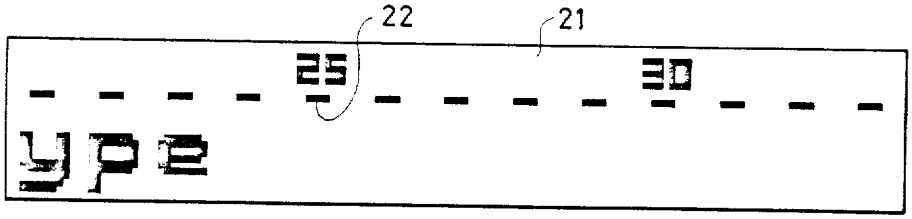
FIG. 3C illustrates the state shifted leftward from the state of FIG. 3B.

By the above execution of the steps S7 and S6, the row of characters displayed by display 21 is shifted left for one character, a character or space newly input, if any, is displayed at the end of the row of characters, the numerals and indicative signs in one-to-one correspondence to the print positions, displayed in the upper portion of display 21, are also shifted left, and a sign indicative of the print position of the new input character is displayed (FIG. 3C).

As described above, according to the present invention, the print position of a character displayed can be known by causing a sign indicative of the position of a character corresponding to the print position of the character to correspond to the character and to be displayed. Thus very efficient document inputting can be performed.

What is claimed is:

1. A document processor comprising:
input means for inputting a document;
memory means for storing the document input by said input means;
a first scale;
print means, having a scale indicator for indicating a printing position relative to said scale, for printing the document stored in said memory means onto a print medium in the direction of said first scale as indicated by said scale indicator;
display means for displaying a second scale corresponding to said first scale and for displaying characters to be printed; and
control means for controlling said print means such that the document stored in said memory means is read out and printed, and for controlling said display means such that said second scale of said display means is displayed in correspondence with the characters to be printed.

2. A document processor according to claim 1, further comprising print position memory means for storing positions in which the characters are to be printed by said print means.

3. A document processor according to claim 1, wherein said display means comprises a one-line display.

4. A document processor according to claim 1, further comprising means for setting a selected one of a plurality of character pitches, wherein said control means controls said display means such that said second scale is displayed in correspondence with the selected one of the plurality of character pitches set by said setting means.

5. A document processor according to claim 1, further comprising means for setting a print character unit, wherein in response to the print character unit set by said setting means, said control means controls said print means and said display means such that the characters are printed and displayed.

6. A document processor comprising:
input means for inputting a document;
memory means for storing the document input by said input means;

print means for printing the document stored in said memory means onto a print medium;

first display means for displaying on a first scale position in which a character is to be printed onto the print medium by said print means;

second display means for displaying one portion of the scale of said first display means as a second scale and for displaying characters to be printed by said print means; and control means for controlling said second display means such that the second scale of said second display means is displayed in correspondence with the printing by said print means, and the characters to be printed are displayed in correspondence with the display of the second scale of said second display means.

7. A document processor according to claim 6, further comprising print position memory means for storing positions in which the characters are to be printed by said print means.

8. A document processor according to claim 6, wherein said second display means comprises a one-line display.

9. A document processor according to claim 6, further comprising means for setting a selected one of a plurality of character pitches, wherein said control means controls said second display means such that said second scale is displayed in correspondence with the selected one of the plurality of character pitches set by setting means.

10. A document processor according to claim 6, further comprising means for setting a print character unit, wherein said print means prints the characters in response to the print character unit set by said setting means.

11. A document processor comprising:

input means for inputting character information;

memory means for storing the character information input by said input means;

a carrier having a print head mounted thereon;

a first scale;

print means, having a scale indicator for indicating the position of said carrier relative to said first scale, for moving said carrier in the direction of said scale as indicated by said scale indicator and causing said print head to print the characters onto a print medium;

display means for displaying a second scale indicating the carrier position in correspondence with said first scale as indicated by said scale indicator; and control means for controlling said print means such that said carrier is moved, and for controlling said display means such that said second scale of said display means is displayed in correspondence with the characters to be printed.

12. A document processor according to claim 11, further comprising carrier position memory means for storing positions to which said carrier is moved by said print means.

13. A document processor according to claim 11, wherein said display means comprises a one-line display.

14. A document processor according to claim 11, further comprising means for setting a selected one of a plurality of character pitches, wherein said control means controls said display means such that said second scale is displayed in correspondence with the selected one of the plurality of character pitches set by said setting means.

15. A document processor according to claim 11, further comprising means for setting a print character unit, wherein, in response to the print character unit set by said setting means, said control means controls said print means and said display means such that the characters are printed and displayed.

* * * * *

UNITED STATES PATENT AND TRADEMARK OFFICE
CERTIFICATE OF CORRECTION

PATENT NO. : 4,841,478

DATED : June 20, 1989

INVENTOR(S) : Tsutomu Takahashi

It is certified that error appears in the above-identified patent and that said Letters Patent is hereby corrected as shown below:

[57] Abstract

Change "characters displayed" to --character displayed--.

COLUMN 1

Line 58, change "object" to --additional object--.

COLUMN 2

Line 7, change "FIG. 3A," to --FIG. 3A--.
Line 35, change "pitch scale" to --a pitch scale--.

COLUMN 4

Line 4, change "of characters maximum number" to --maximum number of characters are--.
Line 61, change "wherein" to --wherein,--.

COLUMN 5

Line 3, change "scale posi" to --scale a posi---.

UNITED STATES PATENT AND TRADEMARK OFFICE
CERTIFICATE OF CORRECTION

PATENT NO. : 4,841,478

DATED : June 20, 1989

INVENTOR(S) : Tsutomu Takahashi

It is certified that error appears in the above-identified patent and that said Letters Patent is hereby corrected as shown below:

COLUMN 5

Line 31, change "setting means." to --said setting means.--.

Signed and Sealed this

Nineteenth Day of June, 1990

*Attest:*

HARRY F. MANBECK, JR.

*Attesting Officer*

*Commissioner of Patents and Trademarks*